United States Patent [19]

Buxbaum

[11] 4,123,454

[45] Oct. 31, 1978

[54] THERMOPLASTIC COPOLYESTERS

[75] Inventor: Lothar Buxbaum, Lindenfels, Odenwald, Germany

[73] Assignee: Ciba-Geigy Corporation, Ardsley, N.Y.

[21] Appl. No.: 838,281

[22] Filed: Sep. 30, 1977

[30] Foreign Application Priority Data

Oct. 7, 1976 [CH] Switzerland ................ 12701/76

[51] Int. Cl.² ............................................. C08G 63/18
[52] U.S. Cl. ................................. 260/22 D; 260/33.4 P; 528/173; 528/191; 528/194; 528/190
[58] Field of Search ................. 260/47 C, 49, 22 D

[56] References Cited

U.S. PATENT DOCUMENTS

| | | | |
|---|---|---|---|
| 2,035,578 | 3/1936 | Wagner | 260/2 |
| 3,220,977 | 11/1965 | Jackson, Jr. et al. | 260/47 |
| 3,511,808 | 5/1970 | Hodge et al. | 260/47 |
| 3,704,279 | 11/1972 | Ismail | 260/61 |

*Primary Examiner*—Lester L. Lee
*Attorney, Agent, or Firm*—Luther A. R. Hall

[57] ABSTRACT

Linear thermoplastic polyesters obtained from aromatic dicarboxylic acids and diols are modified with dimeric acids. As a result of the lowering in the melt viscosity, processing at lower temperatures is made possible by this means, while the mechanical properties are only slightly changed.

13 Claims, No Drawings

THERMOPLASTIC COPOLYESTERS

The present invention relates to linear thermoplastic copolyesters obtained from aromatic dicarboxylic acids, dimeric acids (higher aliphatic dicarboxylic acids) and bisphenols, processes for their preparation and their use.

Thermoplastic polyesters obtained from dicarboxylic acids and aromatic diols, for example polyesters which are obtained from aliphatic and/or aromatic dicarboxylic acids and aromatic diols and which can also contain aliphatic diols, are known. They are described, for example, in U.S. Pat. Nos. 3,351,624, 3,317,464, 3,297,633, 3,471,441 and 3,398,120 and in German Offenlegungsschrift 2,438,053. A substantial disadvantage of these polyesters is that they are difficult to process because of high softening temperatures and melt viscosities, which requires processing temperatures which can be at the limit of the stability to heat of the polyesters. The latter applies in particular in the case of the polyesters which consist mainly of phthalic acids and bisphenols. A further disadvantage is that these polyesters have inadequate electrical insulating properties and, for some applications, inadequate toughness characteristics.

The object of the present invention is to provide polyesters which are obtained from aromatic dicarboxylic acids and bisphenols and are so modified that, with only a slight deterioration in the mechanical properties, they have a lowered melt viscosity and, thus, better processability, the electrical insulating properties also being improved.

The present invention relates to linear thermoplastic polyesters which have a relative viscosity of at least 1.3, measured on a solution of 1 g of polyester in 100 ml of a solvent consisting of equal parts of phenol and symmetrical tetrachloroethane at 30° C., and consist, relative to the polyester, of a) 49.5 to 45 mol % of at least one aromatic dicarboxylic acid and b) 50 mol % of at least one bisphenol of the general formula I

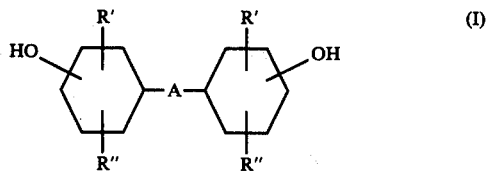

in which R' and R" are hydrogen atoms, alkyl having 1 to 6 C atoms or chlorine or bromine atoms and A is a direct bond or O, S or SO$_2$ or substituted or unsubstituted alkylidene, cycloalkylidene or alkylene, wherein c) 0.5 to 5 mol % of one or more dimeric acids have been co-condensed as the modifying component.

The relative viscosity is preferably 1.5 to 3.5. Suitable aromatic dicarboxylic acids which can be used are: terephthalic acid, isophthalic acid, o-phthalic acid, 1,3-, 1,4-, 2,6- or 2,7-naphthalenedicarboxylic acid, 4,4'-diphenyldicarboxylic acid, 4,4'-diphenylsulphone-dicarboxylic acid, 1,1,3-trimethyl-5-carboxy-3-(p-carboxyphenyl)-indane, 4,4'-diphenyl ether-dicarboxylic acid, bis-p-(carboxyphenyl)-methane and stilbenedicarboxylic acid.

Amongst the aromatic dicarboxylic acids, terephthalic acid and isophthalic acid, and also orthophthalic acid, are preferred.

Mixtures of terephthalic acid and isophthalic acid, which preferably contain terephathalic acid to the extent of 30 to 70 mol % and isophthalic acid to the extent of 70 to 30 mol %, are particularly preferred.

In the bisphenols of the formula I, the OH groups are preferably bonded in the meta-position and especially in the para-position. R' and R" in formula I are preferably bonded in the two ortho-positions relative to the OH groups and are preferably a hydrogen atom or a chlorine atom or methyl.

As alkyl, R' and R" can also be ethyl, propyl, i-propyl, butyl, t-butyl, pentyl or hexyl.

In formula I, A is preferably substituted or unsubstituted alkylidene, cycloalkylidene and alkylene. That group of bisphenols in which the OH group is bonded in the p-position and R' and R" are hydrogen atoms is particularly preferred.

Examples of substituted or unsubstituted alkylidene are: ethylidene, 1,1- or 2,2-propylidene, 2,2-butylidene, 1,1-isobutylidene, pentylidene, hexylidene, heptylidene, octylidene, dichloroethylidene and trichloroethylidene.

Examples of substituted or unsubstituted alkylene are methylene, ethylene, phenylmethylene, diphenylmethylene and methylphenylmethylene.

Examples of cycloalkylidene are cyclopentylidene, cyclohexylidene, cycloheptylidene and cyclooctylidene.

Examples of bisphenols are: bis-(p-hydroxyphenyl) ether or bis-(p-hydroxyphenyl) thioether, bis-(p-hydroxyphenyl)sulphone, bis-(p-hydroxyphenyl)-methane, 1,2-bis-(p-hydroxyphenyl)-ethane, phenyl-bis-(p-hydroxyphenyl)-methane, diphenyl-bis-(p-hydroxyphenyl)-methane, 2,2-bis-(4'-hydroxyl-3',5'-dimethylphenyl)-propane, 2,2-bis-(4'-hydroxy-3'-methylphenyl)-propane, 1,1- or 2,2-bis-(p-hydroxyphenyl)-butane, 1,1-dichloro-or 1,1,1-trichloro-2,2-bis-(p-hydroxyphenyl)-ethane, 1,1-bis-(p-hydroxyphenyl)-cyclopentane and, especially, 2,2-bis-(p-hydroxyphenyl)-propane (bisphenol A) and 1,1-bis-(p-hydroxyphenyl)-cyclohexane (bisphenol C).

Dimeric acids are understood as meaning dicarboxylic acids which are obtained by dimerisation of higher unsaturated aliphatic carboxylic acids, especially the fatty acids. The carboxylic acids contain at least 13 C atoms, and the dimeric acids preferably contain 26 to 40 C atoms. Dimeric acids of this type are known and available commercially. Amongst these acids, that having 36 C atoms is particularly preferred and in the text which follows is designated dimeric acid. (Trade name Empol 1010 from Unilever-Emery). When the dimeric acids are prepared, they can still contain a small number of residual double bonds, which do not have to be removed before the acids are employed for a polycondensation reaction. However, it has proved appropriate largely to remove these residual double bonds by hydrogenation.

The polyesters according to the invention can be obtained according to a known method by subjecting the dicarboxylic acids a) and c), or their polyester-forming derivatives, to a polycondensation reaction with at least one bisphenol, or a polyester-forming derivative thereof, until the desired viscosity is reached. As a rule, the polycondensation reaction is carried out at temperatures of 0° to 320° C. and under normal pressure, in vacuo and/or in a stream of inert gas.

The known methods for the preparation of the novel polyesters are, for example, solution condensation or azeotropic condensation, interfacial condensation, melt condensation or solid phase condensation, including in thin layers, as well as combinations of these methods, depending on which polyester-forming derivatives and reaction catalysts are used.

Polyester-forming derivatives of the dicarboxylic acids which are used are, preferably, the diaryl esters. In principle, it is possible to use any desired diaryl esters, in the main the diphenyl esters of isophthalic acid and terephthalic acid. However, it is also possible to use diaryl esters of substituted phenols, thus, for example, dicresyl esters, esters of butylphenols or esters of halogenated phenols. For particular special processes, the free dicarboxylic acids or the acid dihalides are used. The bisphenols are employed as such or in the form of diesters with low-molecular carboxylic acids, for example the diacetates.

The polyesters according to the invention are preferably prepared from the diphenyl esters of the dicarboxylic acids a), the free bisphenols and the free dicarboxylic acids c). The starting components are reacted in an inert atmosphere, for example nitrogen or argon, and in the presence of catalysts, by a melt condensation process and transesterification process, which are known per se; i.e. the diaryl ester, the bisphenol and the dicarboxylic acid c) are introduced into a suitable reaction vessel, such as a stirred reactor or a stirred thin film reactor, and, after adding catalysts and, if appropriate, stabilisers, the mixture is warmed to the reaction temperature, which in general is between 180° C. and 320° C. The final part of the reaction is carried out in vacuo, until the polycondensation product has the desired viscosity. After it has been removed from the reaction vessel and cooled, the resulting polyester melt is comminuted in a conventional manner. The diaryl ester of the aromatic dicarboxylic acid and the bisphenol are used in stoichiometric ratios, although each component, and preferably the diaryl ester, can be present in an excess of up to 20%, but preferably of up to 5%. The total amount of each component can also be added in portions in the course of the polycondensation reaction. A proportion (up to 20 mol % of the total amount) of the diphenyl ester can also be replaced by diphenyl carbonate.

The transesterification catalysts and polycondensation catalysts used are known and can be used in the case of the present invention. Examples of such catalysts comprise the alkali metals and alkaline earth metals, magnesium, lead, zinc, antimony, titanium and tin in the form of their compounds, for example in the form of phenolates, oxides, alkoxides, hydrides, borohydrides and alcoholates. Lithium, potassium and sodium are particularly preferred catalysts.

Stabilisers which can be used are the compounds known for polycondensation reactions, thus, for example, aryl phosphites, alkyl phosphites and mixed alkyl-/aryl phosphites and corresponding phosphates.

Another embodiment for the preparation of the novel polyesters consists in subjecting dihalides of the dicarboxylic acids a) and c), preferably the acid dichlorides, to a polycondensation reaction with bisphenols in the presence of a basic catalyst, in the temperature range of 0° to 100° C., with the elimination of hydrogen halide. The basic catalysts used are preferably amines or quaternary ammonium salts. The proportion of basic catalyst can be from 0.1 to 800 mol % and more, preferably 0.1 to 100 mol %, relative to the acid halides. This procedure can be carried out without a solvent or in the presence of a solvent. It can be carried out in homogeneous solution in organic solvents or as an interfacial condensation reaction in a water/organic solvent system.

The polycondensation reaction can also be carried out by first subjecting the starting compounds to a condensation reaction in the melt until a certain viscosity is reached, then comminuting or granulating the precondensate prepared in this way, for example with the aid of an underwater granulator, drying the granules, if desired crystallising them using a crystallisation auxiliary and then subjecting them to a solid phase condensation reaction, for which vacuum and temperatures below the melting point of the granules are employed. Higher viscosities can be achieved by this means.

The post-condensation can also be carried out in the melt, and in this case an extruder suitable for such reactions, for example a twin-screw extruder, or a twin-screw kneader can advantageously be used.

In another embodiment, the procedure employed can also be that a precondensate of the dicarboxylic acids a), or their polyester-forming derivatives, and the bisphenols and a precondensate of the dicarboxylic acids c), or their polyester-forming derivatives, and the bisphenols are prepared separately and these precondensates are mixed in the melt and then together subjected to a polycondensation reaction in the melt of the solid phase, until the desired viscosity is reached. This gives mainly block polycondensation products in which the polyester chains contain segments of the precondensates.

Inert additives of all types, for example fillers or reinforcing fillers, such as talc, kaolin, metal powders, wollastonite and, especially, glass fibres, inorganic or organic pigments, optical brighteners, delustering agents, mould release agents, agents which promote crystallisation, flame-proofing agents or stabilisers against thermal degradation, can be added to the reaction mass during working up of the polyester melt or even prior to the polycondensation reaction.

If the polycondensation reaction is carried out discontinuously, the inert additives can even be added during the final condensation steps, for example during the solid phase condensation reaction or at the end of the melt condensation.

The polyesters according to the invention are amorphous and transparent, depending on which diols and which dicarboxylic acids are used as the starting components and the ratios in which these are employed. The polyesters are colourless to brown coloured and soluble in organic solvents and are thermoplastic materials (engineering plastics), from which mouldings having valuable properties can be produced by the conventional shaping processes, such as casting, injection moulding and extruding. Examples of such mouldings are components for technical equipment, apparatus casings, household equipment, sports equipment, electrical insulations, car components, circuits, sheets, films, fibres and semi-finished products which can be shaped by machining. It is also possible to use the polyesters for coating articles by known powder coating processes, and lacquer-coating using a spreadable solution of the polyester is also possible. Furthermore, the polyesters according to the invention are also suitable as hot-melt adhesives, for the production of sintered filters and for the production of machine parts by the sinter-welding process.

The polyesters according to the invention show a surprisingly great reduction in the melt viscosity, coupled with only slightly changed properties, and this makes processing at lower temperatures possible with fewer problems. The electrical insulating properties of the polyesters are surprisingly improved and, amongst the mechanical properties, the notched impact strength is surprisingly improved.

The polyesters prepared according to the examples which follow are characterised in more detail by the following identifying data. The polyesters are characterised by those morphological changes which are measured by means of differential thermal analysis on a sample which has been heat-treated at 30° C. above the melting point or softening point for 3 minutes and then rapidly chilled. The chilled sample is heated at a heating rate of 16° C./minute by means of a "DSC-1B" differential scanning calorimeter from Messrs. Perkin-Elmer. The thermogram of the sample shows the glass transition temperature ($T_g$), the crystallisation temperature ($T_c$) and the crystallite melting point ($T_m$).

The glass transition temperature is given as the turning point at the sudden increase in the specific heat in the thermogram, the crystallisation temperature is given as the apex of the exothermic peak, the melting point is given as the apex of the endothermic peak and the decomposition temperature ($T_d$) is given as that point at which the sudden exothermic and endothermic variations in the specific heat start. The relative viscosity of the polycondensation products of the examples is determined on solutions of 1 g of polyester in 100 ml of a mixture consisting of equal parts of phenol and symmetrical tetrachloroethane, at 30° C. The softening point ($T_s$) is determined on a Kofler heated stage microscope at a heating rate of 15° C./minute, a cross being formed from 2 filaments and the softening point being designated as that temperature at which the sharp angles of the cross disappear. The examples which follow serve to illustrate the invention in more detail.

EXAMPLES 1-3 AND COMPARISON EXAMPLE

Diphenyl terephthalate, diphenyl isophthalate, bisphenol A (see the table for the molar ratios) and 0.01% of titanium (relative to the sum of the acids) in the form of the tetraisopropylate are melted together in a 10 l reactor fitted with a stirrer, a $N_2$ inlet and a distillation bridge, and the melt is slowly brought to 250° C. After the evolution of phenol has started, the temperature is raised to 280° C. and 60 to 80% of the theoretical amount of phenol are distilled off in the course of about 60 minutes.

At this time, the molar amount, indicated in the table, of an aliphatic dicarboxylic acid is added, and after a further 15 minutes a vacuum of about 0.5 mm Hg is slowly applied. The reaction is discontinued 30 minutes after the full vacuum has been reached.

The precondensate obtained in this way is powdered, spread out in a thin layer on Teflon-coated sheet metal and subjected to a further condensation reaction in a vacuum drying cabinet at 220° C. and under 0.2 mm Hg for 48 hours. For comparison, a polyester is prepared from diphenyl terephthalate, diphenyl isophthalate and bisphenol A.

The end products are processed into test pieces using an injection moulding machine and the properties indicated in the table are determined:

TABLE

| Composition | | Molar ratio | | | |
|---|---|---|---|---|---|
| Terephthalic acid + isophthalic acid + bisphenol A + dimeric acid (Empol 1010) | | 0.285:0.19: 0.5:0.025 | 0.295:0.195: 0.5:0.01 | 0.2975:0.1975: 0.5:0.005 | |
| Terephthalic acid + isophthalic acid + bisphenol A (comparison example) | | | | | 0.3:0.2: 0.5 |
| $\eta_{rel}$(polymer) | | 1.78 | 2.08 | 1.77 | 1.71 |
| $\eta_{rel}$(test piece) | | 1.72 | 1.61 | 1.69 | 1.79 |
| Processing temperature (° C) | | 250/260 | 250/260 | 300/310 | 330/340 |
| Mechanical properties | Specification | | | | |
| Flexural strength (kp/cm²) | DIN 53,452 NKS | 1,070 | 1,050 | 1,035 | 1,010 |
| Modulus of elasticity from a bending test (kp/cm²) | ASTM D 790 | 16,500 | 17,000 | | 22,000 |
| Impact strength (cmkp/cm²) | DIN 53,453 NKS | no break | no break | no break | no break |
| Notched impact strength (cmkp/cm²) | DIN 53,453 NKS | 20 | 18.4 | 18.2 | 11 |
| Heat distortion point (° C) | ISO/R 75 PS A | 123 | 143 | 156 | 160 |
| Glass transition temperature (° C) | DSC | 150 | 165 | 180 | 190 |
| Arcing resistance (seconds) | ASTM D 495 | 30 | 26 | 15 | 7 |
| Tracking resistance (V) | DIN 53,480 KC | 260 | 225 | 200 | 100 |
| Example No. | | 1 | 2 | 3 | comparison |

EXAMPLES 4-11

The polyesters listed in the table which follows are prepared analogously to Examples 1-3, in a 200 ml glass reactor fitted with a stirrer, a $N_2$ inlet and a distillation head with a condenser, the batch size being between 10 and 50 g.

In Examples 4-7 the procedure of the known acid replacement process is followed and, for this, the free acids and the bisphenol in the form of the diacetate are employed. 0.05% of magnesium is employed as the catalyst. Acetic acid distils off. In other respects, the procedure is analogous to Example 1.

A post-condensation in a thin layer is not carried out, but is possible.

| Example No. | Composition | Molar ratio | $\eta_{rel}$ | $T_g$(° C) | $T_s$(° C) |
|---|---|---|---|---|---|
| 4 | 4,4'-Diphenylsulphonedicarboxylic acid + IPA + BPA diacetate + DA | 0.3:0.19: 0.5:0.01 | 1.28 | 186 | 220 |
| 5 | TPA + IPA + Diacid 1550 + BPA diacetate | 0.3:0.175: 0.025:0.5 | 1.38 | 160 | 180 |

-continued

| Example No. | Composition | Molar ratio | $\eta_{rel}$ | $T_g$ (°C) | $T_s$ (°C) |
|---|---|---|---|---|---|
| 6 | TPA + IPA + Diacid 1550 + BPA diacetate | 0.2:0.25:0.05:0.5 | 1.35 | 139 | 170 |
| 7 | PIDA + DA + BPA diacetate | 0.475:0.025:0.5 | 1.23 | 182 | 215 |
| 8 | DPT + DPI + DA + BPA + tetrabromo-BPA | 0.3:0.18:0.02:0.45:0.05 | 1.22 | 170 | 190 |
| 9 | DPT + DPI + methylenedixylenol + DA | 0.3:0.195:0.5:0.005 | 1.32 | 182 | 190 |
| 10 | DPT + DPI + dihydroxydiphenylsulphone + DA | 0.3:0.19:0.5:0.01 | 1.25 | 175 | 205 |
| 11 | DPT + DPI + bisphenol C + DA | 0.3:0.19:0.5:0.01 | 1.19 | 138 | 175 |

TPA = terephthalic acid
IPA = isophthalic acid
DA = dimeric acid
BPA = bisphenol A
PIDA = phenylindanedicarboxylic acid (Messrs. Amoco)
DPT = diphenyl terephthalate
DPI = diphenyl isophthalate
Diacid 1550 = dimeric acid having 21 C atoms (Messrs. Westvaco, U.S.A.)

What is claimed is:

1. A linear thermoplastic copolyester which has a relative viscosity of at least 1.3, measured on a solution of 1 gram of polyester in 100 ml of solvent consisting of equal parts of phenol and symmetrical tetrachloroethane at 30° C., which comprises the condensation product in about a 1:1 molar ratio of diacids (a) and (c) with bisphenols (b) so that the composition of the polyester comprises in the diacid component of the polyester (a) from 49.5 to 45 mol %, based on the total polyester, of radicals of at least one aromatic dicarboxylic acid, and (c) from 0.5 to 5 mol %, based on the total polyester, of radicals of one or more dimer acids; and in the bisphenol component of the polyester (b) 50 mol %, based on the total polyester, of radicals of at least one bisphenol of the formula I

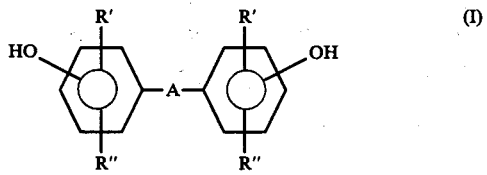

wherein R' and R" are hydrogen, alkyl of 1 to 6 carbon atoms, chloro or bromo, and A is a direct bond, O, S, SO$_2$, alkylidene of 2 to 8 carbons atoms, dichloroethylidene, trichloroethylidene, alkylene of 1 to 2 carbon atoms, phenylmethylene, diphenylmethylene or cycloalkylidene of 5 to 8 carbon atoms; wherein the radicals (a) and (c) are attached to the radicals (b) through ester linkages in a random distribution.

2. A copolyester according to claim 1, which has a relative viscosity of 1.5 to 3.5.

3. A copolyester according to claim 1, wherein the aromatic dicarboxylic acid is terephthalic acid, isophthalic acid or mixture thereof.

4. A copolyester according to claim 3, which contains, relative to the aromatic dicarboxylic acid, a mixture of 30 to 70 mol % terephthalic acid and 70 to 30 mol % of isophthalic acid.

5. A copolyester according to claim 1, wherein, in the bisphenol of the formula I, the OH groups are bonded in the meta position or in the p-position.

6. A copolyester according to claim 5, wherein R' and R" are bonded in the two ortho-positions relative to the OH group and are hydrogen, chloro or methyl.

7. A copolyester according to claim 1, wherein A in formula I is ethylidene, 1,1- or 2,2-propylidene, butylidene, 1,1-dichloroethylidene, 1,1,1-trichloroethylidene, cyclopentylidene, cyclohexylidene, cycloheptylidene, cyclooctylidene methylene, ethylene, phenylmethylene, diphenylmethylene or methylphenylmethylene.

8. A copolyester according to claim 7, wherein the OH groups are bonded in the p-position and R' and R" are hydrogen.

9. A copolyester according to claim 8, wherein the bisphenol is 2,2-bis-(p-hydroxyphenyl)-propane or 1,1-bis-(p-hydroxyphenyl)-cyclohexane.

10. A copolyester according to claim 1, wherein the dimer acid contains 26 to 40 C atoms.

11. A copolyester according to claim 10, wherein the dimer acid is a C$_{36}$-dicarboxylic acid.

12. A copolyester according to claim 1 having 1 to 3 mol % of radicals of dimer acid (c).

13. A copolyester according to claim 5 wherein the OH groups are bonded in the p-position in the bisphenol of formula I.